US009603298B2

(12) United States Patent
Wendte et al.

(10) Patent No.: US 9,603,298 B2
(45) Date of Patent: *Mar. 28, 2017

(54) MULTIPLE SEED-TYPE PLANTING SYSTEM WITH CHARGING SYSTEM

(71) Applicant: CNH Industrial America LLC, New Holland, PA (US)

(72) Inventors: Keith W. Wendte, Willowbrook, IL (US); Brian T. Adams, Centralia, MO (US); Marvin A. Prickel, Homer Glen, IL (US); Brian J. Anderson, Yorkville, IL (US); Chad M. Johnson, Arlington Heights, IL (US); Jason T. Czapka, Munster, IN (US); Scott A. Long, Plainfield, IL (US); Michael J. Connors, Lockport, IL (US); Darian E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,776

(22) Filed: Feb. 6, 2015

(65) Prior Publication Data

US 2015/0223390 A1     Aug. 13, 2015

Related U.S. Application Data

(60) Provisional application No. 61/937,188, filed on Feb. 7, 2014.

(51) Int. Cl.
   *A01C 7/04*     (2006.01)
   *A01C 21/00*     (2006.01)
   *A01C 7/10*     (2006.01)

(52) U.S. Cl.
   CPC .................. *A01C 7/10* (2013.01); *A01C 7/04* (2013.01); *A01C 21/00* (2013.01); *A01C 21/005* (2013.01)

(58) Field of Classification Search
   CPC .. A01C 9/00; A01C 1/04; A01C 14/00; A01C 7/04; A01C 7/10; A01C 21/00
(Continued)

(56) References Cited

U.S. PATENT DOCUMENTS 5,170,730 A    12/1992   Swallow
5,402,741 A    4/1995   Truax et al.
(Continued)

FOREIGN PATENT DOCUMENTS

EP         2684436      1/2014
WO    WO-9842178    10/1998

OTHER PUBLICATIONS

Raven multi-variety planter; Farming Industry News; 2013 http://farmindustrynews.com/planters/closer-look-industry-s-first-multi-hybrid-planter?NL=FIN-02&Issue=FIN-02__20130614.
(Continued)

*Primary Examiner* — John G Weiss
(74) *Attorney, Agent, or Firm* — Rebecca L. Henkel; Rickard K. DeMille

(57) ABSTRACT

A system for planting multiple types of seed and automatically switching between the varieties during planting in a single planting pass of a planting session of row-crop or other planting of an agricultural field. The system may include a bulk storage system, an on-row storage system, and a charging system that selectively delivers seeds of different varieties from the bulk storage system to the on-row storage system. The system may include a seed metering system that can be controlled at each of multiple row units to selectively plant different types or varieties of
(Continued)

seed based on seed type or variety zones agricultural field, which may correspond to field characteristics defined in a seed variety prescription map.

20 Claims, 13 Drawing Sheets

(58) Field of Classification Search
USPC .................. 111/18, 24, 63, 73, 74, 186, 188
See application file for complete search history.

(56) References Cited

U.S. PATENT DOCUMENTS

| | | | |
|---|---|---|---|
| 5,740,746 A | 4/1998 | Ledermann et al. | |
| 5,915,313 A * | 6/1999 | Bender | A01B 79/005 |
| | | | 111/178 |
| 6,070,539 A | 6/2000 | Flamme et al. | |
| 6,193,175 B1 | 2/2001 | Andersson et al. | |
| 6,516,733 B1 | 2/2003 | Sauder et al. | |
| 6,672,228 B1 | 1/2004 | Groelz et al. | |
| 6,692,228 B2 | 2/2004 | Turnquist et al. | |
| 7,021,224 B2 | 4/2006 | Mayerle et al. | |
| 7,140,310 B2 | 11/2006 | Mayerle et al. | |
| 7,418,908 B2 * | 9/2008 | Landphair | A01C 15/006 |
| | | | 111/175 |
| 7,775,167 B2 | 8/2010 | Stehling et al. | |
| 7,938,075 B1 | 5/2011 | Glendenning et al. | |
| 8,543,238 B2 | 9/2013 | Straeter | |
| 8,942,894 B2 | 1/2015 | Garner et al. | |
| 8,948,980 B2 | 2/2015 | Garner et al. | |
| 2004/0079264 A1 | 4/2004 | Mayerle et al. | |
| 2005/0103244 A1 | 5/2005 | Mayerle et al. | |
| 2008/0295751 A1 | 12/2008 | Shoup et al. | |
| 2011/0054743 A1 | 3/2011 | Kocer et al. | |
| 2011/0098851 A1 | 4/2011 | Glendenning et al. | |
| 2011/0178632 A1 | 7/2011 | Straeter | |
| 2013/0192503 A1 * | 8/2013 | Henry | A01C 7/082 |
| | | | 111/174 |
| 2014/0165890 A1 | 6/2014 | Graham | |
| 2014/0165891 A1 | 6/2014 | Garner et al. | |
| 2014/0174330 A1 | 6/2014 | Garner et al. | |
| 2015/0059629 A1 | 3/2015 | Kinzenbaw et al. | |

OTHER PUBLICATIONS

Deere refuge plus option; 2006 http://salesmanual.deere.com/sales/salesmanual/en_NA/seeding/2006/feature/handling/planters/deereplanter_ccs_refuge_plus.html.

Kinze multiple variety planter; 2013 http://www.kinze.com/article.aspx?id=167&Kinze+Announces+the+World%27s+First+Electric+Multi-Hybrid+Concept+Planter.

Kinze Announces the World's First Electric Multi-Hybrid Concept Planter; No-Till Farmer; 2013; http://www.no-tillfarmer.com/articles/2342-kinze-announces-the-worlds-first.

Invitation to Pay Additional Fees / Partial International Search Report; PCT/US2015/014771.

PCT/US2015/014771, International Search Report and Written Opinion dated Aug. 5, 2015, 19 pages.

* cited by examiner

METERING AND BULK FILL CONFIGURATIONS

| METERING SYSTEM | | BULK FEED SYSTEM | | | |
|---|---|---|---|---|---|
| | | INDIVIDUAL LINE FOR EACH VARIETY FOR EACH ROW | SINGLE LINE FOR EACH VARIETY FEEDING MULTIPLE ROWS | SINGLE LINE FOR EACH ROW FEEDING ALL VARIETIES | SINGLE LINE FEEDING ALL VARIETIES FOR ALL ROWS |
| METER | ON-ROW STORAGE | ⌐105  113 | ⌐107  115 | ⌐109  117 | ⌐111  119 |
| SINGLE | SINGLE | FIG. 7 (96) | FIG. 8 (4) | FIG. 9 (24) | FIG. 10 (1) |
| SINGLE | MULTIPLE | FIG. 11 (96) | FIG. 12 (4) | FIG. 13 (24) | FIG. 14 (1) |
| MULTIPLE* | MULTIPLE* | (96) | (4) | (24) | (1) |
| | | ⌐121 | ⌐123 | ⌐125 | ⌐127 |

*MULTIPLE/MULTIPLE WOULD LOOK THE SAME AS SINGLE/MULTIPLE EXCEPT THERE WOULD BE ADDITIONAL SEED METERS INTERNALLY FOR EACH VARIETY ON EACH OF THE ROW UNITS

**NUMBER IN PARENTHESIS IS THE NUMBER OF INDIVIDUAL LINES REQUIRED TO FEED SEED TO ALL THE ROWS FOR A 24 ROW PLANTER. THE NUMBER OF LINES COULD BE MORE THAN THIS NUMBER, DEPENDING ON THE SIZE OF THE LINE SELECTED AND THE CAPABILITY OF THAT LINE TO TRANSFER SEED AT THE REQUIRED RATE.

FIG. 15

MULTIPLE SEED-TYPE PLANTING SYSTEM WITH CHARGING SYSTEM

CROSS-REFERENCE TO RELATED APPLICATION

The present application claims the benefit of U.S. Ser. No. 61/937,188 filed Feb. 7, 2014.

FIELD OF THE INVENTION

The invention relates generally to planters or seeders and, in particular, to planters and seeders for planting multiple types or varieties of seed.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. However, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include ancillary row units or two separate and distinct seed meters at every row unit.

SUMMARY OF THE INVENTION

The present invention is directed to systems for seeding and systems for row crop planting that allow for seeding or planting multiple types of seed, which may include planting at varying rates, in a single planting pass. The system may allow for multiple types of seed to be delivered through a seed distribution system from multiple compartments respectively storing the multiple types of seed on an agricultural implement to a seed delivery system of the agricultural implement. The seed distribution system of the agricultural implement is controlled to release seeds of the multiple types to the seed delivery system for release onto multiple areas of an agricultural field.

According to one aspect of the invention, a planting system is provided that allows for planting multiple types or varieties of seed in a single planting pass with a planter without requiring ancillary row units, multiple seed meters at every row unit, or emptying out or planting out a first type or variety of seed before switching to a second type or variety of seed. The invention allows for substantially instantaneous switchover of seed variety on a bulk fill planter with a bulk storage system for storing at least one of the seed types or varieties in a central bulk fill hopper(s) that avoids substantial time periods of mixed seed variety plant during transition between planting a first seed type or variety and planting a second seed type or variety.

According to one aspect of the invention, a method is provided for planting multiple types or varieties of seed at varying rates in a single planting pass during row-crop planting of an agricultural field. The method may include programming a control system of at least one of a tractor and a planter to identify multiple type or variety zones of an agricultural field defined at least in part by characteristics relating to at least one of soil type and management type. This may include loading a seed type or variety prescription map, along with appropriate population and planter settings, for the agricultural field into the control system. Seeds of multiple varieties may be delivered from multiple compartments of a bulk storage system of the planter to a seed metering system of the planter. The seed metering system of the planter may be controlled to release seeds of the multiple varieties to multiple areas of the agricultural field that correspond to the multiple type or variety zones of the agricultural field. This allows using a prescription map to determine which seed varieties are to be planted and where.

The control system may include a tractor controller having a GPS (global positioning system) module for automatically locating or guiding the tractor. The tractor controller may automatically guide the tractor and control release of seeds of the multiple varieties to correspond to the seed variety prescription map.

The control system may be configured to adjust a setting of at least one seed meter of the seed metering system. This may include automatically adjusting at least one of a seed disk rotational speed for adjusting seed population, adjusting a seed singulator setting, adjusting vacuum level, adjusting baffle position, and adjusting the seed pool level. These automatic adjustments may provide seed meter performance changes to correspond to different needs of a particular type or variety zones of the agricultural field, as represented by the prescription map.

The planter may include multiple row units and the seed metering system may include a seed meter arranged at each of the multiple row units. The seed meters of the multiple row units receive seeds of different varieties for simultaneously planting the seeds of different varieties from respective different ones of the row units when the planter spans across multiple type or variety zones of the agricultural field. This provides planting of individual varieties on a per-row basis. The control system may be configured to selectively deliver seeds of the multiple varieties from the multiple compartments of the bulk storage system to the seed meters of the multiple row units for controlling planting of an individual seed variety on a per-row basis.

The control system may be configured to individually adjust a seed disk rotational speed at each seed meter for varying seed population on a per-row basis.

According to another aspect of the invention, seeds of a first variety may be delivered from a first compartment of a bulk storage system of the planter to a seed meter of the planter. The seeds of the first variety are singulated in the seed meter for individually releasing the seeds of the first variety from the planter to a first type or variety zone of the agricultural field. The first type or variety zone of the agricultural field is defined by an area of the agricultural field having a first characteristic relating to at least one of soil type and management type. Seeds of a second variety are delivered from a second compartment of the bulk storage system of the planter to the seed meter of the planter. The seeds of the second variety are singulated in the seed meter for individually releasing the seeds of the second variety from the planter to a second type or variety zone of the agricultural field. The second type or variety zone of the agricultural field is defined by an area of the agricultural field having a second characteristic relating to at least one of soil type and management type. Releasing the seeds of the first variety from the seed meter to releasing the seeds of the second variety from the seed meter is switched during a time period during which the planter travels from the first type or variety zone to the second type or variety zone. This allows for automatically switching of planting a first variety to a second variety of seed based on location, speed, and heading of the tractor and planter.

The seed meter may include a seed tube or other seed conveyance system directing delivery of seeds released from the seed meter toward the agricultural field. The seeds of the first and second seed variety are released from the seed meter and delivered through the seed tube to the first and second type or variety zones of the agricultural field, respectively. This allows for planting multiple varieties of seed at separate times through a single seed tube, which provides consistent seed placement transversely within a trench without requiring extra seed meters, extra row units, or sharp turning of the tractor to compensate for transverse seed placement spacing at a guess row while changing the varieties of seed that are planted.

According to another aspect of the invention, a seed metering system of a planter is charged by delivering seeds of multiple varieties from multiple compartments of a bulk storage system to respective multiple compartments of an on-row storage system. Seeds of a first type or variety are delivered from a first one of the compartments of the on-row storage system to the seed metering system. Seeds of the first variety are released from the seed metering system to a first type or variety zone of the agricultural field defined by an area of the agricultural field having a first characteristic relating to at least one of soil type and management type. Seeds of a second variety are delivered from a second one of the compartments of the on-row storage system to the seed metering system. Seeds of the second type or variety are released from the seed metering system to a second type or variety zone of the agricultural field defined by an area of the agricultural field having a second characteristic relating to at least one of soil type and management type.

The seed metering system(s) may release seeds of the first and second varieties simultaneously from first and second row units of the planter for controlling planting of an individual seed variety on a per-row basis. Each of the first and second row units has a seed meter for singulating and individually releasing the seeds onto the agricultural field. Each of the multiple compartments of the on-row storage system can be charged independently of the other ones of the multiple compartments of the on-row storage system, such as by way of discrete independent charging events based on a detected fill value of the respective compartment. The charging of the seed metering system can automatically maintain each of the multiple compartments of the on-row storage system in a full condition. This allows for automatically keeping the on-row storage system, such as on-row hoppers, fully charged.

According to another aspect of the invention, a seed level in each of multiple compartments of an on-row storage system, which may be partition-separated compartments of a single mini-hopper or separate and distinct compartments, is detected at each of multiple rows of the planter.

The multiple compartments hold seeds of multiple varieties, with each compartment holding seeds of a different variety than the other compartments. An evaluation is made to determine whether any of the detected seed levels are below a predetermined minimum seed level. A seed level of a compartment detected as being below the predetermined minimum seed level defines a low-level compartment. Seeds are released from a compartment of a bulk storage system storing the same variety of seed as in the low-level compartment.

An amount of seeds released from the compartment of the bulk storage system can correspond to an amount of seeds needed to fill the low-level compartment to a completely full level based on the detected seed level. This may be done by way of a metering roll, for example, a calibrated metering, at each of the compartments of bulk storage system. This allows for delivering only as much seed as needed from the bulk storage system to the on-row storage system.

According to another aspect of the invention, during charging, a first seed gate is actuated to selectively direct seed from the bulk storage system to the on-row storage system of one of the rows of the planter. This allows a single conduit such as a primary conduit or main frame conduit to be used for selectively directing one of multiple seed varieties to different row units, toward the on-row storage system(s). A second seed gate is actuated to selectively direct seeds into one of the compartments of the on-row storage system. This allows for using seed gates to selectively direct seeds into proper compartments.

According to another aspect of the invention, a first position of at least one of a tractor and planter towed by the tractor for crop planting within an agricultural field is determined relative to a predetermined first type or variety zone for receiving seed of a first variety based on a characteristic of the first type or variety zone of the agricultural field. Seeds of the first variety are delivered from a first compartment of a bulk storage system of the planter to a seed metering system. Seeds of the first variety are singulated in the seed metering system for individually releasing the seeds of the first variety from the planter when the planter is in the first type or variety zone of the agricultural field. A second position of at least one of the tractor and planter is determined relative to a predetermined second type or variety zone for receiving seed of a second type or variety based on a characteristic of the second type or variety zone of the agricultural field.

Based at least in part on the determination of the second position, delivery of seeds in the first variety from the first compartment of the bulk storage system is stopped, and releasing of the seeds of the first variety from the on-row storage to the row unit reservoir is stopped. Seeds of the second variety are delivered from a second compartment of a bulk storage system of the planter to the seed-metering system. The seeds of the second variety are fed into and pooled within the row unit reservoirs and are eventually singulated in the seed meters of the seed-metering system for individually releasing the seeds of the second variety from the planter when the planter is in the second type or variety zone of the agricultural field. This allows for a quick switch between the first and second seed varieties, minimizing planting of mixed seed varieties by ensuring the seed-metering system is nearly empty of seeds of the first variety before seeds of the second variety are fed into the seed-metering system.

According to another aspect of the invention, a planter is provided for planting multiple varieties of seed in a single planting pass during row-crop planting of an agricultural field. The planter includes a frame supporting multiple row units. The frame also supports a seed-metering system for singulating seeds for individual release from the row units onto the agricultural field and a bulk storage system that has multiple compartments for storing seeds. The compartments of the bulk storage system may be defined within a partitioned bulk fill tank(s) supported by the frame, or the compartments may be defined by individual bulk fill tanks with separate types or varieties in each. An on-row storage system selectively receives seeds from the bulk storage system at the row units. The on-row storage system includes multiple compartments connected to a row unit reservoir. The compartments of the on-row storage system may be defined within a mini-hopper receiving seeds from the bulk storage system, optionally, at least one on-row bulk tank, or other separate and distinct compartments on the row unit. A charging system selectively delivers seeds from the bulk storage system to the on-row storage system based on a position of at least one of the planter and a tractor towing the planter relative to a predetermined multiple type or variety zones of an agricultural field. The multiple type or variety zones are defined at least in part by characteristics relating to at least one of soil type and management type of the agricultural field.

According to another aspect of the invention, metering rollers are arranged between the compartments of the on-row storage system and the row unit reservoir for selectively releasing seeds from respective compartments of the on-row storage system into the row unit reservoir. The seed-metering system includes a seed meter at each of the row units receiving seeds from the row unit reservoir. At least one sensor may be arranged in each of the compartments of the on-row storage system for detecting a seed level in each of the compartments of the on-row storage system. At least one sensor may be arranged in the row unit reservoir of the on-row storage system. A first seed gate system may be arranged to selectively direct seed from the bulk storage system to the on-row storage system of one of the row units of the planter. A second seed gate system is arranged to selectively direct seeds into one of the compartments of the on-row storage system.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 15 shows a chart illustrating the variants of FIGS. 7-14;

DETAILED DESCRIPTION OF THE PREFERRED EMBODIMENTS

Figure 1:
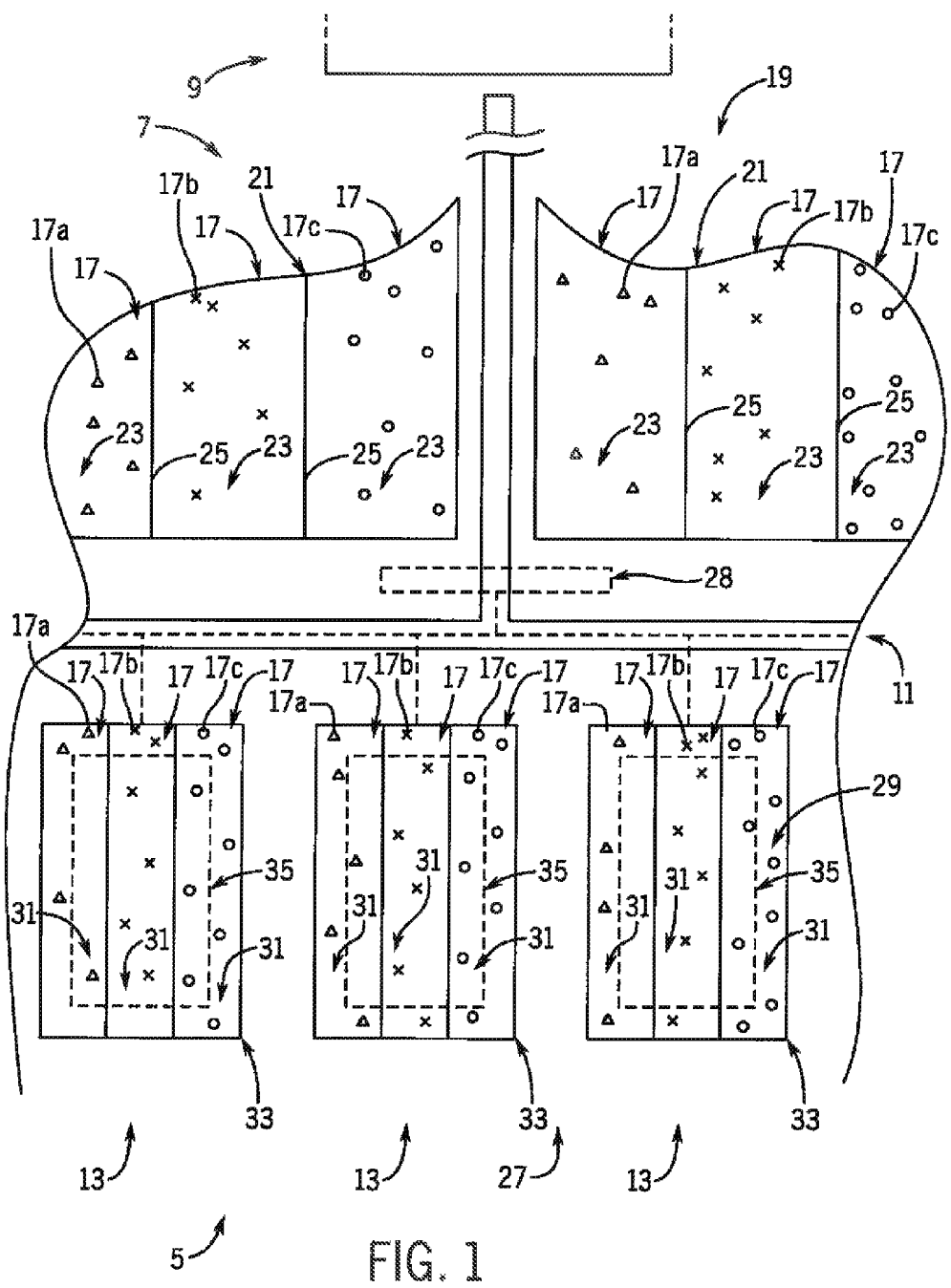
FIG. 1 is a simplified schematic representation of a planting system for planting multiple varieties of seed.

Referring now to the drawings and specifically to FIG. 1, a planting system 5 for planting multiple types or varieties of seed and automatically switching between the types or varieties during planting in a single planting pass of seeding or row-crop planting of an agricultural field is schematically shown. System 5 includes an agricultural implement, shown here as planter 7, which may be one of the EARLY RISER® series planters available from Case IH and is typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the opened furrow to close the furrow and to further firm the soil over the seed to and promote favorable seed-to-soil contact. Although system 5 is shown being incorporated into a planter 7 as the agricultural implement, it is understood that, in other embodiments, the agricultural implement is a seeder which may include an air cart, such as a PRECISION AIR® air cart available from Case IH and an air drill, such as an ATX700 air drill available from Case IH, with various aspects of system 5 being incorporated into the seeder.

Still referring to FIG. 1, in this embodiment, seed 17 is held in bulk storage in a bulk storage system 19. Bulk storage system 19 has at least one bulk fill hopper 21, shown here as having two central bulk fill hoppers 21 supported by the frame 11 of the planter 7, remote from the row units 13. The bulk storage system 19 has multiple compartments 23, shown here as spaces within each of the hoppers 21 that are separated by a divider wall or partitions 25. In another embodiment, the compartments 23 are defined by separate and discrete containers themselves, such as the hoppers 21. Bulk storage system 19 can be configured to provide at least some on-row bulk storage, which may include some or all of the compartments 23 of the bulk storage system 19 as manual-fill on-row storage compartments, as explained in greater detail elsewhere herein. The different compartments 23 may hold seeds 17 of a different plant type or a common plant type but different varieties or types 17a, 17b, 17c for planting in different multiple type or variety zones of an agricultural field defined at least in part by characteristics relating to at least one of soil type and management type, or other characteristics such as low/high ground areas, weed issues, insect issues, fungal issues, buffer zones in organic fields that are planted next to non-organic fields, or others, such as those represented as zones VZ1, VZ2, VZ3, VZ4 in the prescription map PM of FIG. 17. Although three different seed varieties or types 17a, 17b, 17c are shown, it is understood that other numbers of seed varieties may be stored on and planted by the planter 7 based on, for example, the number of compartments 23 in the bulk storage system 19 for a particular planter 7. Although the seed 17 may be described elsewhere herein as different types 17a, 17b, 17c, it is understood that the description of the different types of seed includes different varieties. In other words, the different types 17a, 17b, 17c of seed 17 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn and soybeans, oats and barley, different cover crops such as tillage radishes and rye, or various combinations of these or other combinations.

Figure 2:
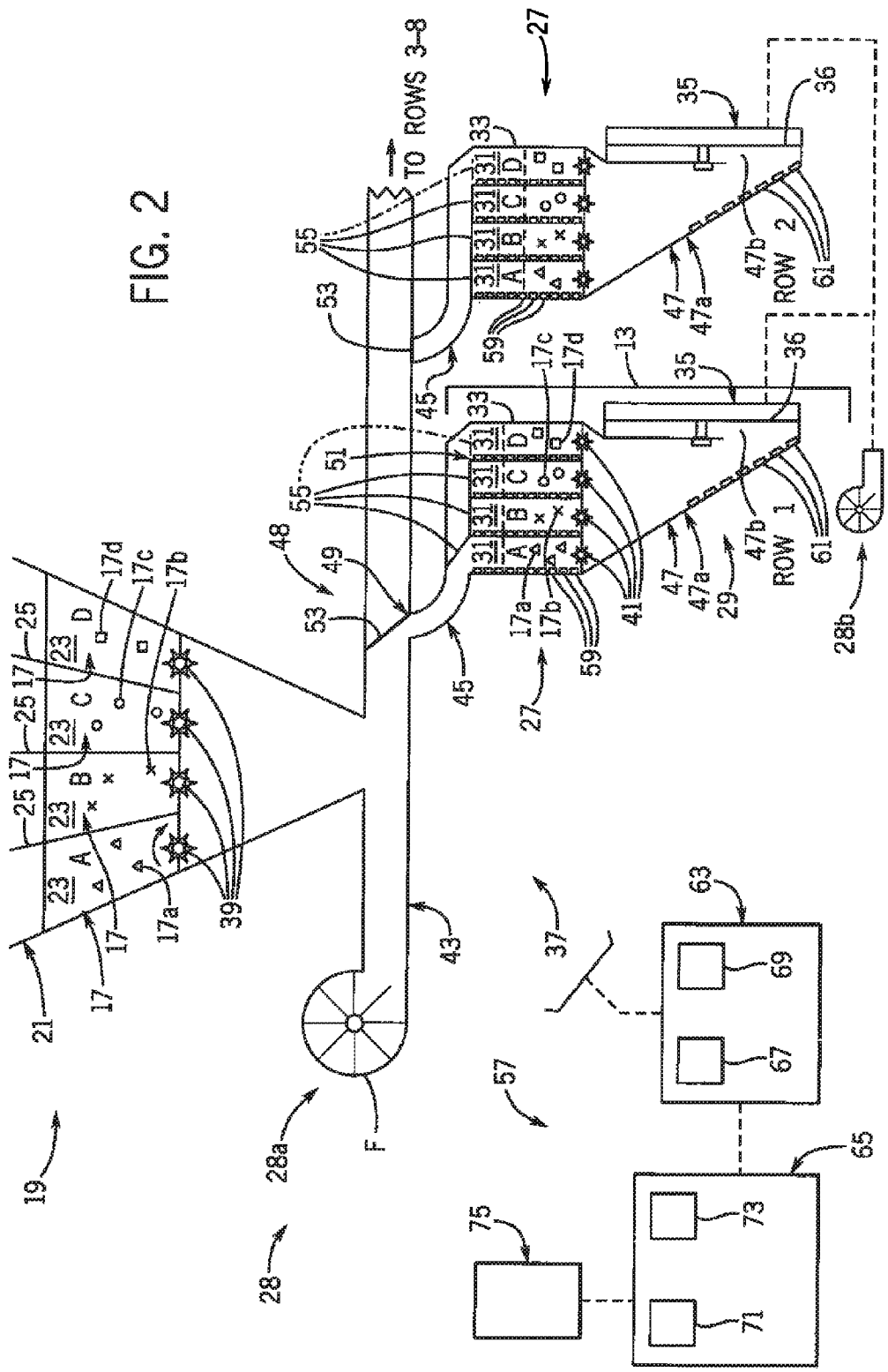
FIG. 2 is a simplified schematic representation of a charging system of the planting system of FIG. 1 showing a step of charging an on-row seed storage system.

Still referring to FIG. 1, based on which type or variety zone of an agricultural field is being planted at a particular time, seeds of the different types 17a, 17b, 17c are selectively released from the bulk storage system 19 for receipt into an on-row storage system 27 by way of an airflow system 28 (FIG. 2). Referring now to FIG. 2, the airflow system 28 provides pneumatic power for use by various components of the planter 7 and is used to convey seeds 17 through the planter 7 to the row units 13 to be dropped into the seed trench formed by the furrow opening mechanism. Airflow system 28 includes a positive air pressure source and may include a vacuum source for establishing positive and vacuum pressures and corresponding airflows. The positive air pressure source and vacuum sources can be known pumps, fans, blowers, and/or other known airflow system components. Airflow system 28 can include a seed conveyance airflow system 28a providing an airflow by way of fan "F" that entrains seeds 17 to move the seeds 17 from bulk storage system 19 to the row units 13 and a seed meter airflow system 28b provides native and/or positive pressure for operation of seed meters at the row units 13, as explained in greater detail elsewhere herein. Each of the seed conveyance and seed meter airflow systems 28a, 28b includes a positive air pressure source(s) and/or vacuum source(s), depending on the particular configurations of the pneumatic system(s) in which they are incorporated. Referring again to FIG. 1, the on-row storage system 27 locally stores relatively small amounts of seeds 17 at each of multiple row units 13 to feed a seed-metering system 29 which can be configured to simultaneously plant different types 17a, 17b, 17c from the different row units 13, or otherwise switch seed types 17a, 17b, 17c being planted, as explained in greater detail elsewhere herein. The different seed types 17a, 17b, 17c selectively sent from the bulk storage system are stored in multiple compartments 31 of the on-row storage system 27 at each row unit 13. The compartments 31 of the on-row storage system 27 may be defined within a vented mini-hopper 33 receiving seeds from the bulk storage system 19, optionally, at least one on-row bulk tank, or other separate and distinct compartments on the row unit 13.

Still referring to FIG. 1, the compartments 31 of the on-row storage system 27 selectively feed the seed types 17a, 17b, 17c to a seed meter 35 of the seed-metering system 29. Each seed meter 35 can be a purely mechanical-type seed meter 35 or a pneumatic seed meter 35. Referring now to FIG. 2, the seed meter 35 includes an internal seed disk 36 that is rotated to move at least a surface of the seed disk through a seed pool inside of the seed meter 35 to pick up and singulate seeds using seed pockets or fingers from the internal seed pool and convey the individual seeds through the seed meter 35 for individual release out of the seed meter 35 through a seed tube toward a seed trench of the agricultural field. Pneumatic seed meters 35 of negative pressure types are further operably connected through a vacuum inlet to the seed meter airflow system 28b (FIG. 2) of the airflow system 28 to provide a vacuum airflow within a vacuum chamber establishing a negative or vacuum pressure within the seed meter 35 opposite the seed pool allowing the seeds to be held against the seed disk such as within the seed pockets by the vacuum pressure. Pneumatic seed meters 35 of positive pressure types are operably connected through a pressurized air inlet to the seed meter airflow system 28b (FIG. 2) to provide a positive airflow and a corresponding positive pressure at the seed side of the seed disk within the seed meter 35, whereby seeds from the seed pool are pushed and held against the seed disk such as within the seed pockets by positive pressure. The seed meter 35 includes a housing that defines a cavity in which a seed singulator that is adjustable, such as remotely adjustable, and configured to inhibit more than one seed from being discharged from the seed meter 35 per seed discharge event and a seed disk 36 (FIGS. 2-4) are arranged and a baffle that is adjustable, such as remotely adjustable, and configured to control the depth of seed in the meter that is exposed to the seed disk 36. Rotation of the seed disk including speed of rotation in the housing cavity adjustable such as remotely adjustable by controlling a seed disk drive system. The seed disk drive system may include, for example, various electric or hydraulic motors, drive shafts, chains and belts, clutches, peg and hole drive systems, and/or other arrangements such as a directly driven arrangement in which a motor directly drives the seed disk at its hub or periphery. The seed meters 35 are operably connected to a control system for adjusting seed disk 36 rotational speed for adjusting the seed population, seed singulator setting, vacuum level, baffle position, and/or seed depth inside the seed meter 35 reservoir, as explained in greater detail elsewhere herein.

Figure 3:
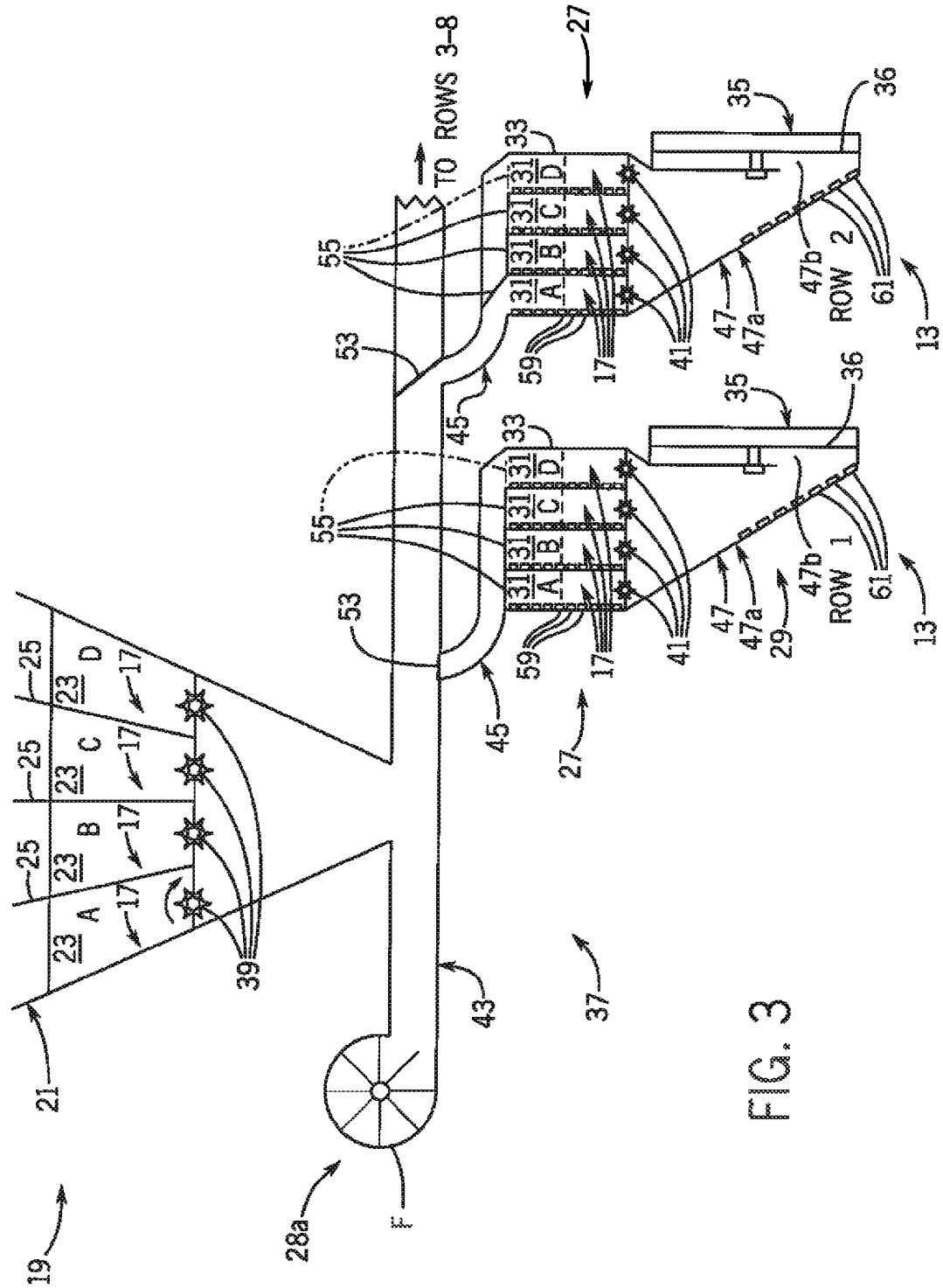
FIG. 3 is a simplified schematic representation of a charging system of the planting system of FIG. 1 showing another step of charging an on-row seed storage system.
Figure 4:
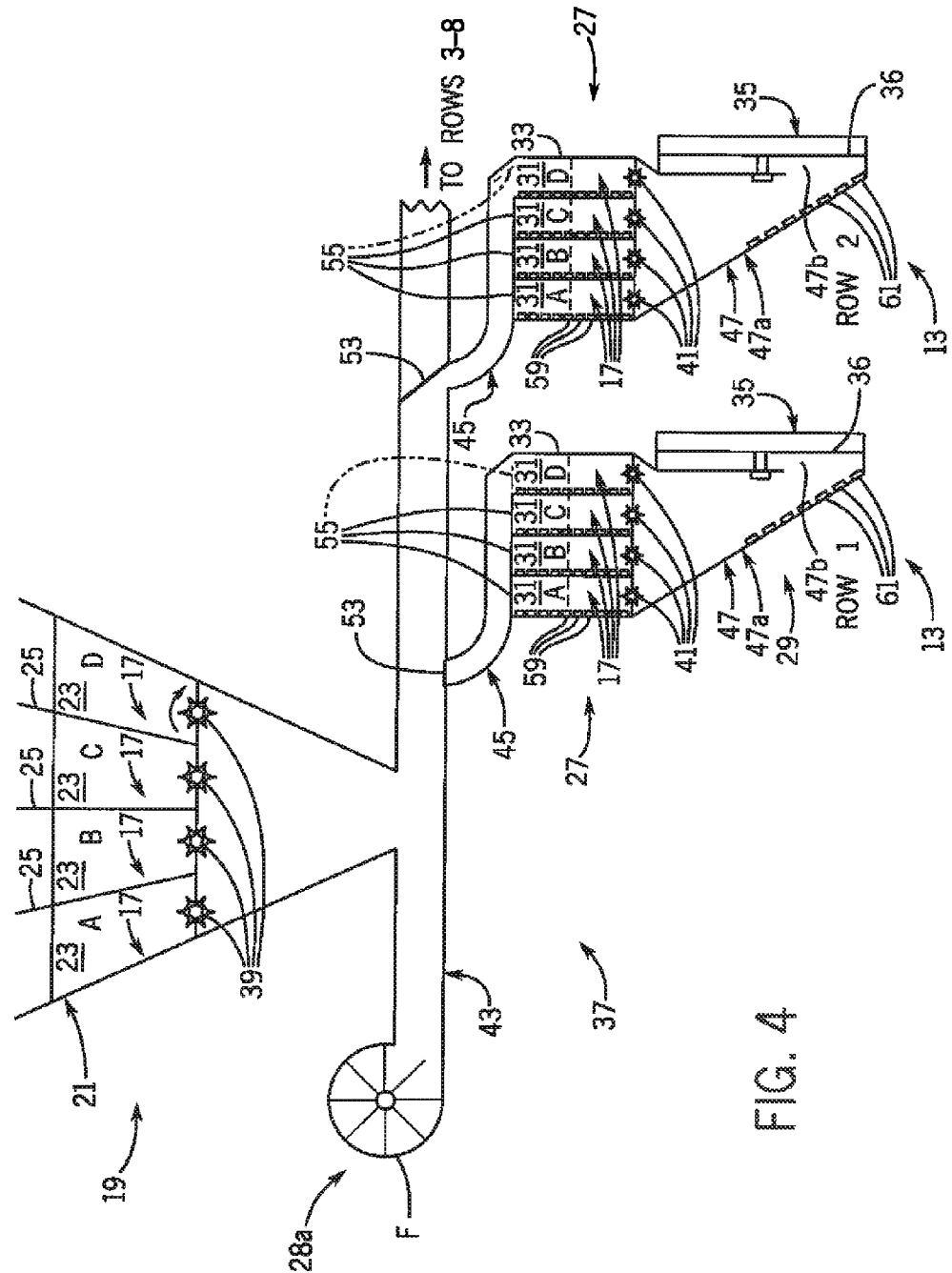
FIG. 4 is a simplified schematic representation of a charging system of the planting system of FIG. 1 showing another step of charging an on-row seed storage system.

Referring now to FIGS. 2-4, system 5 is shown configured for delivering four seed types 17a, 17b, 17e, 17d that can be selectively delivered from the bulk storage system 19 to the row units 13 by way of a charging system 37 that includes the seed conveyance airflow system 28a. Charging system 37 ensures that each seed meter 35 can be selectively delivered controlled amounts of seed of different types 17a, 17b, 17c, 17d based on the different type or variety zones of the agricultural field. The charging system 37 includes rollers such as calibrated fluted rollers 39, 41 at outlets of the compartments 23, 31 of the bulk and on-row storage systems 19, 27, respectively. The rollers 39, 41 are driven by electric, pneumatic, or hydraulic motors to control release of known or calibrated amounts of the seed types 17a, 17b, 17c, 17d from the respective compartments 23, 31. The rollers 39 are rotated in controlled amounts to control release of the seed types 17a, 17b, 17c, 17d out of the compartments 23 of the bulk storage system 19 and into a primary or main frame seed conduit or seed line shown as primary seed feeding line(s) 43 for being selectively directed into secondary or row-unit seed conduits shown as secondary seed feeding line(s) 45. Rollers 41 are rotated in controlled amounts to control release of the seed types 17a, 17b, 17c, 17d out of the compartments 31 of the on-row storage system 27 into a row unit reservoir 47 having a funnel 47a that connects to a seed inlet of the seed meter 35 to deliver seed into a seed chamber 47b that holds seed as a seed pool within an interior cavity of the seed meter 35. It is understood that instead of by way of rollers 39, 41, the controlled downstream release of seeds 17 from the bulk and on-row storage systems 19, 27 may instead be provided by actuating other valving mechanisms or metering devices such as augers or sliding or pivoting gates. Outlets of compartments 23 in the bulk storage system 19 can be operably connected to a seed receiving induction system or bulk metering box(es) that control release of seeds 17 into the seed feeding line(s) 43 connected to such induction system or bulk metering box(es). Outlets of compartments 31 of the on-row storage system 27 can have sliding or pivoting gates to control release of seeds 17 into the seed meters 35.

Still referring to FIGS. 2-4, charging system 37 includes a diverter system 48 (FIG. 2) arranged within the seed conveyance airflow system 28a to selectively control seed conveyance through the planter 7. This may include selectively defining flow paths for the seed 17 through the planter 7 based on location of the planter 7 relative to the multiple type zones VZ1, VZ2, VZ3, VZ4 of the agricultural field or other performance characteristics of the planter 7 at a given time. Diverter system 48 can include a first seed gate system 49 (FIG. 2) and a second seed gate system 51 (FIG. 2) that are arranged within the main frame and row unit seed conduits or primary and secondary seed feeding lines 43, 45 for selectively defining passages within the charging system 37 to ensure that the seed types 17a, 17b, 17c, 17d are directed from the compartments 23 of the bulk storage system 19 into the appropriate compartments 31 of the on-row storage system 27. The first seed gate system 49 includes multiple seed gates 53 that are independently moved by respective actuators to direct seed 17 into one(s) of the seed conduit(s) or secondary seed feeding lines 45 of one(s) of the row units 13. The second seed gate system 51 includes multiple compartment gates or seed gates 55 that are independently moved by respective actuators to direct seed 17 into one(s) of the compartments 31 of the on-row storage system 27.

Still referring to FIGS. 2-4, a control system 57 includes various sensors for determining performance conditions of various systems and components within the planter 7, allowing their control. These include seed-level sensors 59 in the compartments 31 of the on-row storage system 27 configured for determining an amount of seeds of the different types 17a, 17b, 17c, 17d in compartments 31. Seed-level sensors 61 in the row unit reservoir 47 are configured for determining an amount of seed(s) of the different types 17a, 17b, 17c, 17d in compartments 31 and row unit reservoir 47, whereby signals from the seed-level sensors 61 correspond to an amount of seed in the seed pool of the seed chamber 47b of the seed meter 35. It is understood that the seed-level sensors 59, 61 can instead be a single sensor to indicate low level rather than actual level. Other sensors include those arranged within the seed meters 35 to allow making adjustments to control performance of the seed meters 35, based on size or other characteristics of the different types 17a, 17b, 17c, 17d, including controlling the seed singulator, vacuum, baffle, seed disk rotational speed, and seed depth inside a reservoir within the seed meter.

Figure 5:
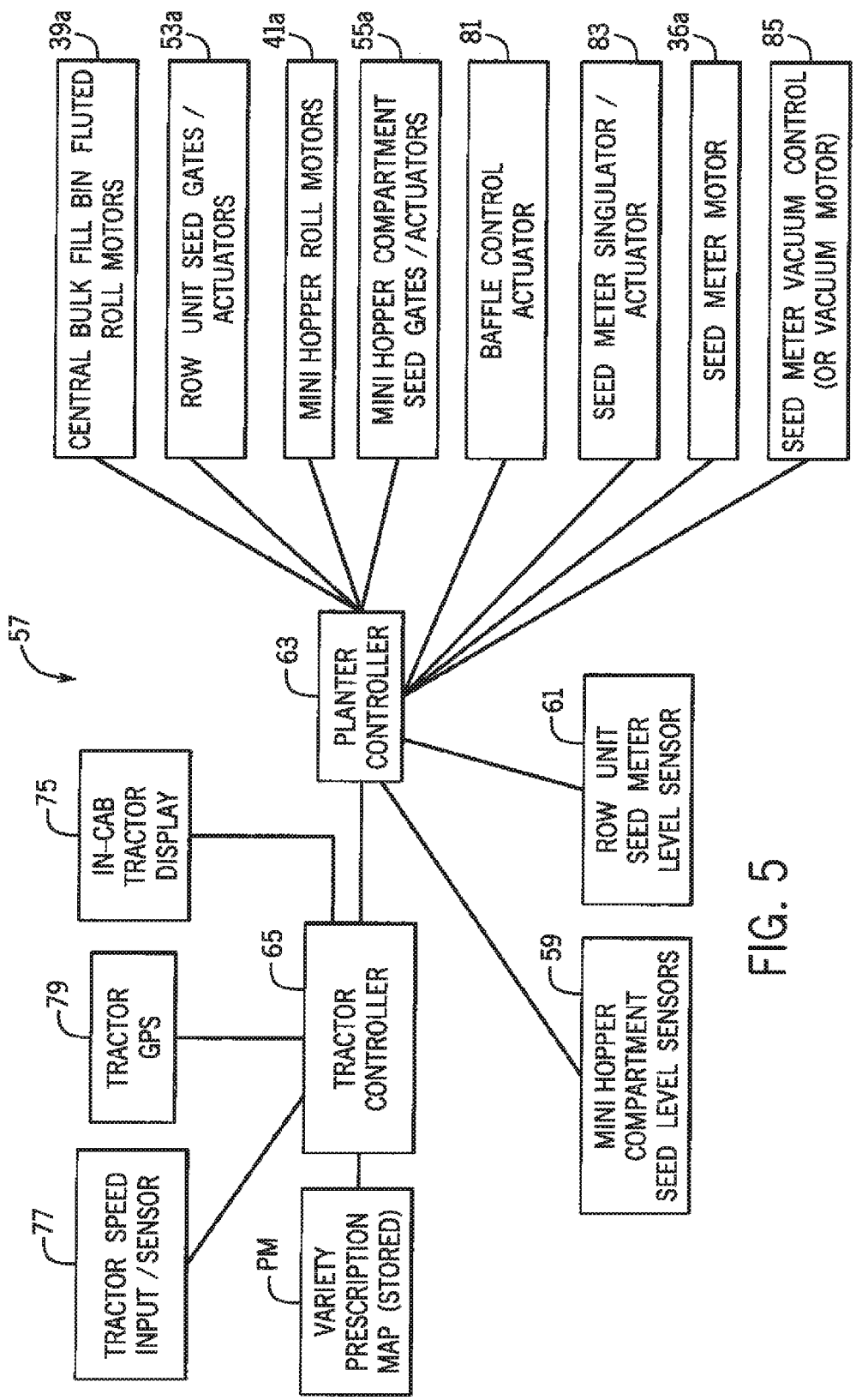
FIG. 5 is a simplified schematic representation of a control system of the planting system of FIG. 1
Figure 17:
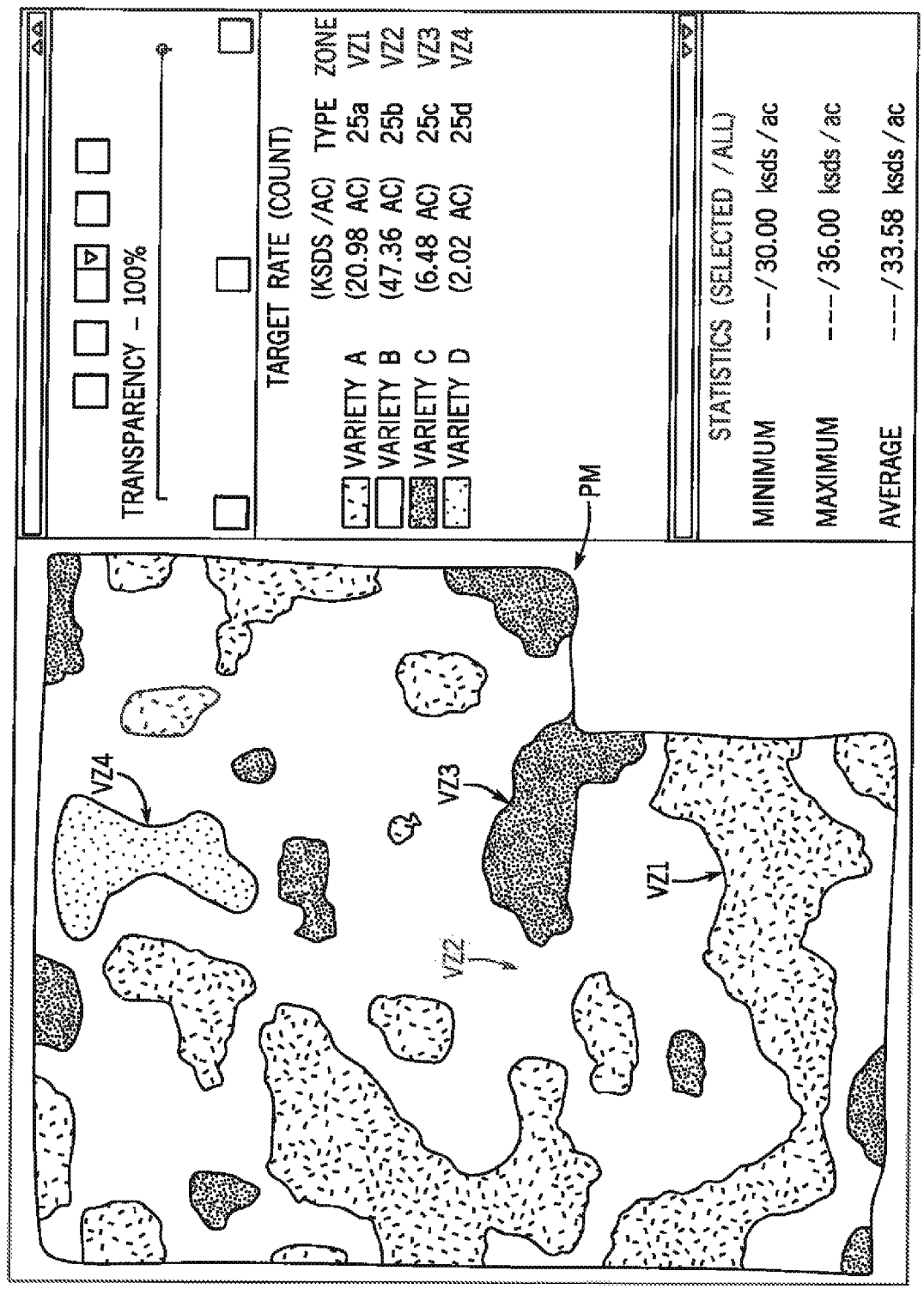
FIG. 17 is an example of a seed variety prescription map for use with the planting system.

Referring now to FIGS. 2 and 5, a planter controller 63 and a tractor controller 65 of the control system 57 operably communicate with each other, for example, by way of an ISOBUS connection, for coordinating controls of planter 7 and tractor 9 (FIG. 1) based on the type or variety zones VZ1, VZ2, VZ3 of the agricultural field, which may correspond to a seed type or variety prescription map PM as shown in FIG. 17. In FIG. 2, the planter controller 63 is shown including a controller 67 and power supply 69. The controller 67 of the planter controller 63 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the planter 7. The tractor controller 65 is configured for controlling operations of the tractor 9 such as controlling steering, speed, braking, shifting, and other operations of the tractor 9. In FIG. 2, the tractor controller 65 is shown including a controller 71 and power supply 73. The tractor controller 65 is configured for controlling the functions of the tractor 9 by controlling the various GPS steering, transmission, engine, hydraulic, and/or other systems of the tractor 7. Like the controller 67 of the planter controller 63, the controller 71 of the tractor controller 65 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 9. A tractor interface system 75 is operably connected to the tractor controller 65 and includes a monitor and various input devices to allow an operator to see the statuses and control various operations of the tractor 9 from within the cab of the tractor 9. The tractor interface system 75 may be a MultiControl Armrest™ console available for use with the Maxxum™ series tractors from Case IH.

Referring now to FIG. 5, during use of system 5, control system 57 can determine planter position, speed, heading, and/or other movement characteristics by way of monitoring tractor position and movement through the tractor controller 65. Tractor controller 65 evaluates a speed input signal from a tractor speed sensor 77 along with a GPS signal or data from tractor GPS 79 with respect to the prescription map PM (FIG. 17). Referring again to FIG. 2, using such evaluations, control system 57 determines which row units 13 should plant which seed type(s) 17a, 17b, 17c, 17d and when, along with determining a charging strategy for the compartments 31 of the on-row storage system 27, to achieve such multi-seed type planting. To facilitate determining the charging strategy, control system 57 interrogates seed levels of seed types 17a, 17b, 17c, 17d and/or other operational characteristics at each row unit 13. This can be done by evaluating signals from the mini-hopper compartment or on-row compartment 31 seed level sensors 59 and seed-level sensors 61 at the bottom of the funnel 47a of the row unit reservoir 47. Referring again to FIG. 5, planter controller 63 evaluates signals from the seed level sensors 59, 61 and communicates with the tractor controller 65 to determine a charging strategy and control strategy for the seed meters 35 (FIG. 2). The planter controller 63 commands selective delivery of the respective seed types 17a, 17b, 17c, 17d to identified target compartment(s) 31 (FIG. 2) of the on-row storage system 27 to achieve multi-seed-type planting according to the prescription map PM (FIG. 17). The control system 57 can do this by using the planter controller 63 to control the central bulk fill fluted roll motors 39; row unit seed gate actuators 53a, mini-hopper compartment seed gate actuators 55a, and mini-hopper roll motors 41a to control rotation or other actuation movement of the rollers 39, row gates 53, compartment seed gates 55, and rollers 39 (FIG. 2), respectively. Referring to FIG. 5, the planter controller 63 controls baffle actuator 81, singulator actuator 83, drive motor 36a, and vacuum control mechanism or motor 85 to control actuation, rotation, or other movement or performance characteristics of the baffle, singulator, rotational speed of seed disk 36 (FIG. 2), and vacuum pressure of the seed meter(s) 35.

To use the system 5, an operator first displays the seed type or variety prescription map PM (FIG. 17) on the computer display or monitor of the tractor interface system 75, which would typically be inside the tractor cab. The prescription map PM displays which seed types 17a, 17b, 17c are to be planted and where, corresponding to the type or variety zones VZ1, VZ2, VZ3. The operator inputs which seed types 17a, 17b, 17c are stored in compartments 23 of the bulk storage system 19 through the tractor interface system 75. The prescription map PM may also contain the seed population that is to be planted for each type or types 17a, 17b, 17c. The seed population could also be varied within the field based on soil type, organic matter, etc. The size of the seeds can also be input into the tractor interface system 75. This information could also be made available in the database that is built from the desktop software when the prescription map PM was created. Knowing the seed size will allow the control system 57 to control seed meter 35 settings such as vacuum, seed pool level, baffle, and singulator to ensure proper metering of individual seeds 17. Preferred settings for the seed meter 35 could also be preset by the operator and based on historical data or data provided by the seed 17 or planter 7 manufacturer. Adjustment of the seed meter 35 to obtain the preferred settings can be done by adjusting the vacuum setting for each meter 35 manually or automatically controlled from inside the tractor cab through the tractor interface system 75. Similarly, the seed singulator and baffle can be controlled manually or automatically through the control system 57 for each row unit 13, which may include making the actual physical adjustment(s) to the singulator and/or baffle. In one embodiment, an electrical solenoid or step motor attached to the singulator and/or baffle is controllable to make such adjustments.

Figure 6:
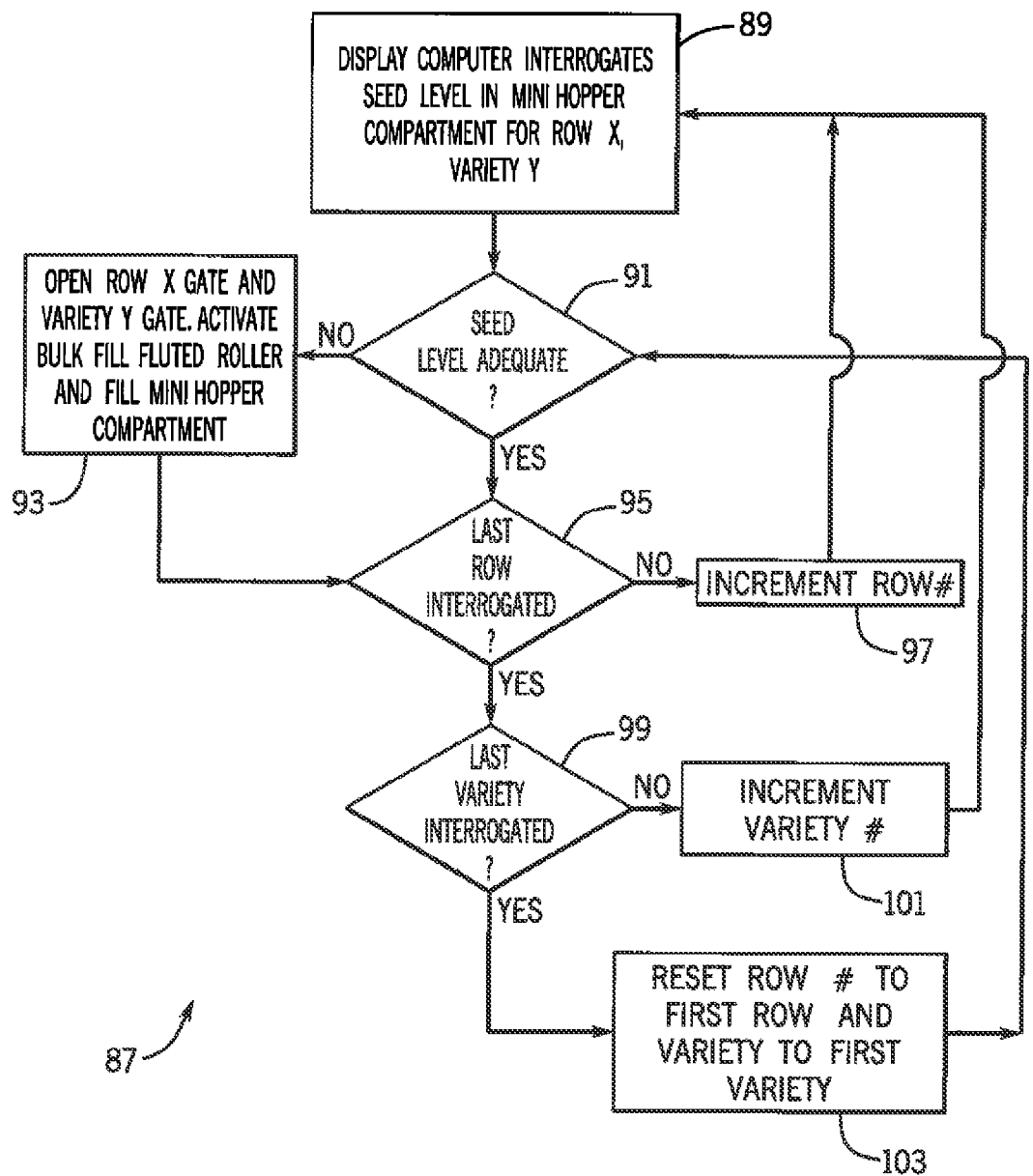
FIG. 6 is a flowchart showing a method for charging the on-row seed storage system.

Referring again to FIGS. 2-4, when the system 5 is first started, the control system 57 determines seed level in each of the compartments 31 of the on-row storage system 27 based on a signal(s) from the seeds level sensors 59 in the compartments 31. FIG. 6 shows a flowchart of an exemplary method 87 of charging the on-row storage system 27 by filling the compartments 31 with seed types 17a, 17b, 17c, 17d from the bulk storage system 19.

Referring still to FIG. 6 and with further reference to FIGS. 2-4, as represented at block 89, the control system 57 interrogates the seeds level sensors 59 of the compartments 31 of the on-row storage system 27, which may be done sequentially. As an initial step, as represented at block 91, the control system 57 interrogates the seeds level sensors 59 in compartment 31A of row 1. If it is empty or below a certain level, the control system 57 sends a signal to the planter controller 63 which powers the motor (not shown) that rotates the roller 39 at the outlet of the compartment 23 located at a base of the bulk fill hopper 21 of the bulk storage system 19. Rotating the roller 39 dispenses seed 17 of the seed type 17a into the main frame seed conduit or primary seed feeding line 43. Since the volume of seed in compartment 31 is known, the roller 39 for the compartment 23 of the bulk storage system 19 is calibrated to meter out only the exact quantity of seed that is required to fill the compartment 31a of the on-row storage system 27 of the particular row unit 13 for the row being filled with a seed variety at that particular time. The seed 17 is conveyed along the primary seed feeding line(s) 43 by way of airflow produced by the fan F. As represented at block 93, a row gate 53 is activated to seed 17 toward one of the row units 13. For example, when the seed 17 arrives at a junction between the primary seed feeding line(s) 43 and the secondary seed feeding line(s) 45 for the "Row 1" row unit 13 (FIG. 2), the gate 53 of the first gate system 49 at this junction is activated and directs flow of air and seed 17 through the row-unit seed conduit or secondary seed feeding line 45 toward the compartments 31 of the on-row storage system 27. Also as represented at block 93, when the seed 17 arrives at the junction between the secondary seed feeding line(s) 45 and the compartments 31 of the on-row storage system 27, a first one of the compartment seed gates 55 of the second seed gate system 51 is opened by the control system 57 to direct the flow of seed 17 and air into the associated compartment 31, in this case compartment 31a, for storing seed type 17a. The seed 17 drops into the compartment 31a and the air is allowed to escape through a perforated lid (not shown) that covers the mini-hopper(s) 33. After the seed 17 is delivered to the row 1 mini-hopper 33 and the seed level sensor 59 for compartment 31a of row 1 has confirmed that the proper amount of seed 17 has been delivered, the seeds level sensor 59 for the compartment holding seed type 17a on row 2 is interrogated. Optionally, a time delay could be put in place to trigger the interrogation of row 2. If seed 17 is required for that compartment, the seed is delivered to compartment 31a on the "Row 2" row unit 13 by actuating the seed gates 53, 55 to direct the seed 17 into compartment 31a on the "Row 2" row unit 13. The actuated positions of the seed gates 53, 55 to achieve this are shown in FIG. 3. As represented at blocks 95, 97, this sequence is repeated for all of the rows of the planter 7 until the type 17a compartments 31 on the mini-hoppers 33 have been completely filled or the seed level sensors 59 indicate that they are already full for all rows. As represented at blocks 99, 101, once the type 17a compartments 31 are full, the sequence is repeated for type 17b on all of the row units 13. FIG. 4 shows the end of the sequence for row 2 and shows type 17d being delivered from the bulk storage system 19 to the compartment 31d of the mini-hopper 33 on row 2. As represented at block 103, once the type 17d compartments 31d have been completely filled for all rows, the entire sequence starts over by interrogating the seed level sensors 59 for the type 17a compartment 31a on row 1. The entire sequence or process 87 is repeated as long as planting continues. The charging process does not necessarily have to be performed in the order that has been previously described. Control system 57 can control the charging process to achieve prioritized filling of on-row hoppers by most immediate need/lowest level based on sensor measurement or the prescription map PM (FIG. 17).

In this way, fill level in the multiple compartments 31 of the on-row storage system 27 can be maintained by a prioritized charging during which an order of filling the multiple compartments 31 is performed according to an immediate need based on at least one of a detected lowest level of seeds 17 within the multiple compartments 31 and a location of the agricultural implement according to the prescription map PM of the agricultural field. Therefore, since the seeds level sensors 59 in the mini-hoppers 33 can sense seed level, the algorithm for determining which seed type(s) 17a, 17b, 17c, 17d should be dispensed and to which row could be determined by, for example, which compartment 31 has the lowest level of seed 17. An additional algorithm could use the seed type or variety prescription map PM (FIG. 17) and look ahead to see which type 17a, 17b, 17c, 17d is predominantly going to be planted and adjust the refilling sequence accordingly. When the entire charging process 87 is completed, the tractor interface system 75 display could signal to the operator that planting can begin.

Referring again to FIG. 5 and with further reference to FIG. 2, by way of the tractor GPS 79 communicating with tractor controller 65, the control system 57 is able to determine which seed types 17a, 17b, 17c, 17d are to be planted by each of the planter row units 13 based on the prescription map PM (FIG. 17) and thus the VZ1, VZ2, VZ3, VZ4. For example, if type 17a is to be planted on row 1, the control system 57 activates an electric motor (not shown) that is connected to and rotates the roller 41 at the outlet of the compartment 31a storing type 17a on row 1 (FIG. 2). The seed 17 is dispensed into the row unit reservoir 47 that directs the seed toward the seed disk 36. Control system 57 can command rotation of rollers 41 so that a predetermined batch size is released, such as approximately 50 seeds metered out at the compartment 31A outlet at a time. When the seed-level sensors 61 at the bottom of the funnel 47a of the row unit reservoir 47 determines more seed 17 is required, the control system 57 determines if row 1 is still required to plant seed type 17a. If it is, then the motor for the roller 41 at the outlet of the compartment 31a storing seed type 17a is again activated and more seeds 17 of type 17a are dispensed into the row unit reservoir 47. If the prescription map PM indicates that seed type 17b is required, the motor for roller 41 of compartment 31b is activated and seed 17 of type 17b is dispensed into the row unit reservoir 47. This process continues as long as the planting operation continues. The same process is used for all of the rows on the planter 7. There is no requirement that all rows must be planting the same type(s) 17a, 17b, 17c, 17d. In one embodiment, each row unit 13 could be planting a different type 17a, 17b, 17c, 17d at different rows at the same time and any individual row could switch from one variety to the other as called for by the seed variety prescription map PM. It is understood that one or more of the zones VZ1, VZ2, VZ3, VZ4 can require a predetermined mixture of two or more of the seed types 17a, 17b, 17c, 17d, whereby the control system 57 controls release of seeds 17 from the bulk and/or on-row storage systems 19, 27 to create a purposeful mixture based on the desired predetermined mixture ratio. The mixing can be done at the charging stage. In this way, the seed types 17a, 17b, 17c, 17d of a zone-required mixture can be simultaneously or otherwise delivered from respective compartments 23 of bulk storage system 19 into a single compartment(s) 31 of the on-row storage system 27, such that the compartment(s) 31 stores the mixture in the on-row storage system 27. The mixing can also be done at the meter feeding stage. In this way, mixing occurs while filling the seed pool(s). This can be done by releasing seeds of multiple types 17a, 17b, 17c, 17d from multiple compartments 31 of the on-row storage system 27 to provide a seed pool having a mixture of the different types of seeds 17a, 17b, 17c, 17d within a seed meter(s) 35. Regardless of where the mixing occurs relative the bulk storage or on-row storage and seed metering systems 19, 27, 29, control system 57 controls release of seeds 17 to provide various mixtures required by a zone-required mixtures such as, for example, a mixture of 25% seed type 17a and 25% seed type 17c, and 50% seed type 17d, by controlled mixing while feeding the seed pool or upstream.

In an embodiment in which different seed populations for the seed types 17a, 17b, 17c, 17d are known for the variety zones, the control system 57 controls the seed meters 35 to achieve the target seed populations. This may be done by manually or automatically adjusting at least one of a seed disk rotational speed for adjusting seed population, a seed singulator setting, vacuum level, baffle position, and/or seed depth inside the seed meter reservoir. Corresponding adjustments can also be made to accommodate different seed type, size or shape, or the varieties, of seed types 17a, 17b, 17c, 17d.

Figure 7:
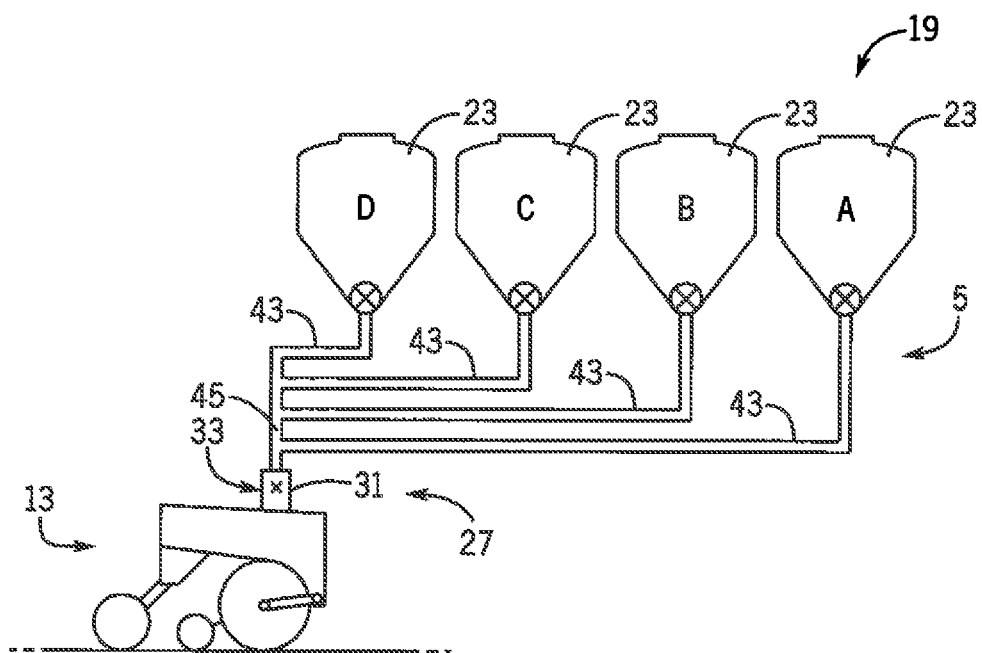
FIG. 7 is another simplified schematic representation of a planting system for planting multiple varieties of seed.
Figure 8:
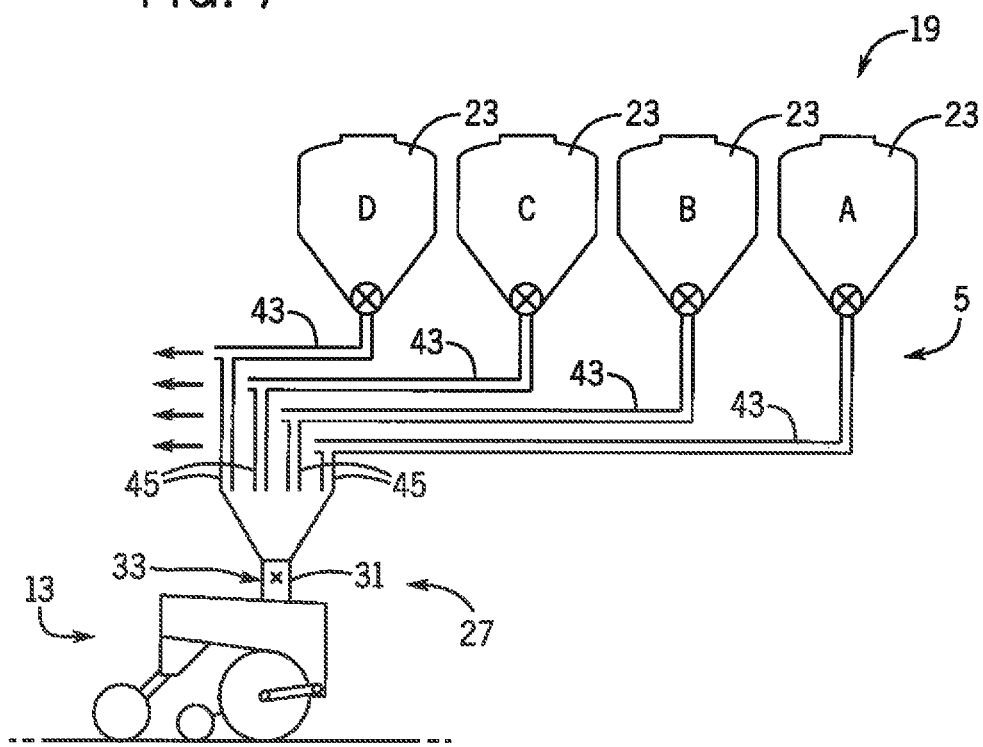
FIG. 8 is another simplified schematic representation of a planting system for planting multiple varieties of seed.
Figure 9:
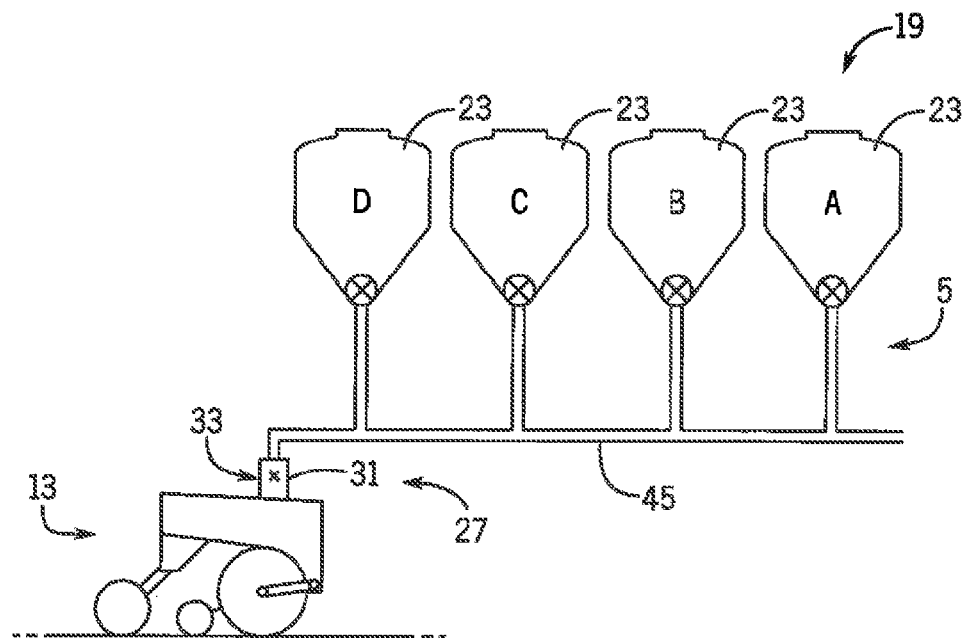
FIG. 9 is another simplified schematic representation of a planting system for planting multiple varieties of seed.
Figure 10:
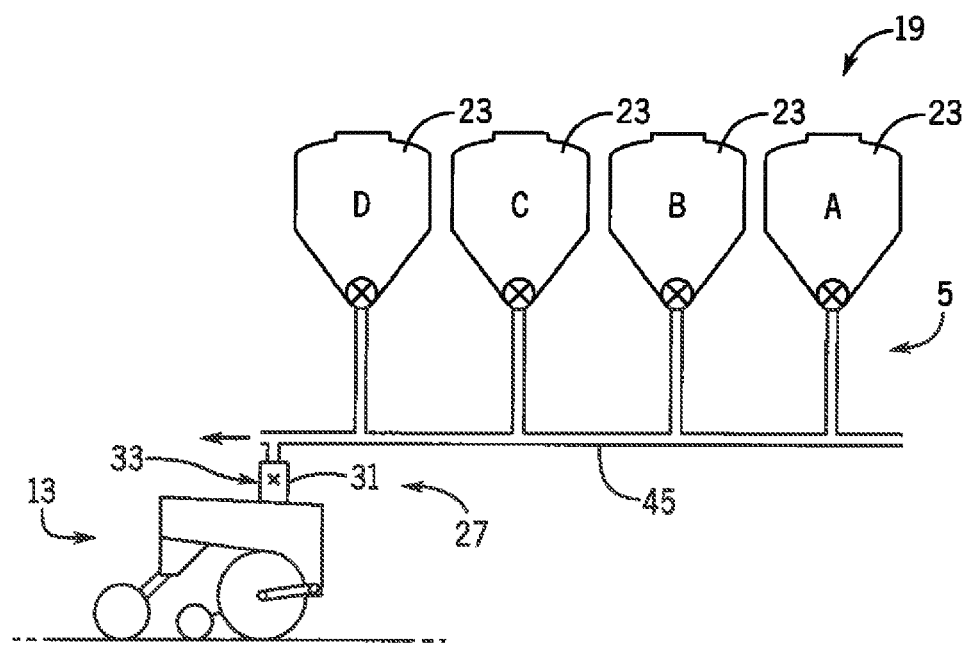
FIG. 10 is another simplified schematic representation of a planting system for planting multiple varieties of seed.
Figure 11:
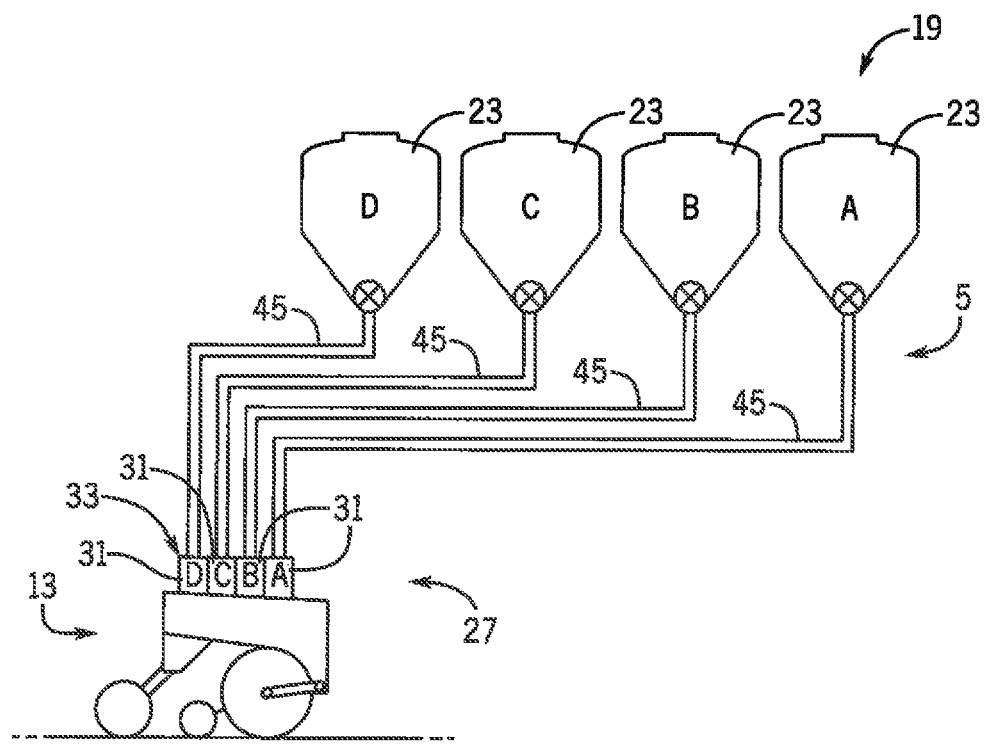
FIG. 11 is another simplified schematic representation of a planting system for planting multiple varieties of seed.
Figure 12:
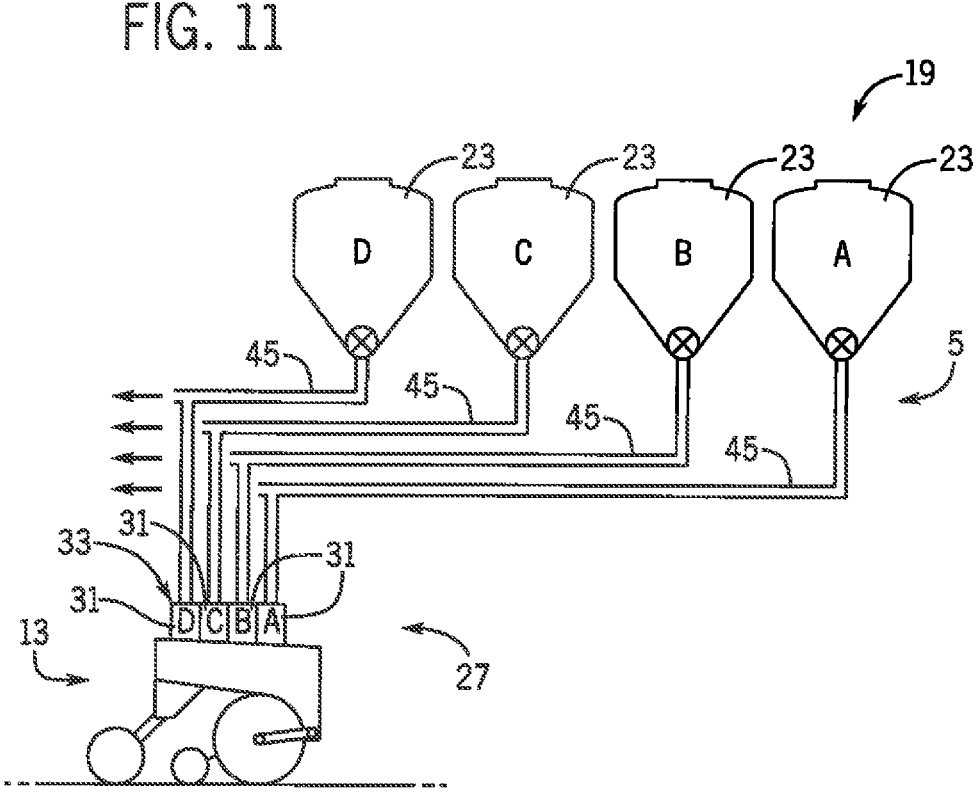
FIG. 12 is another simplified schematic representation of a planting system for planting multiple varieties of seed.
Figure 13:
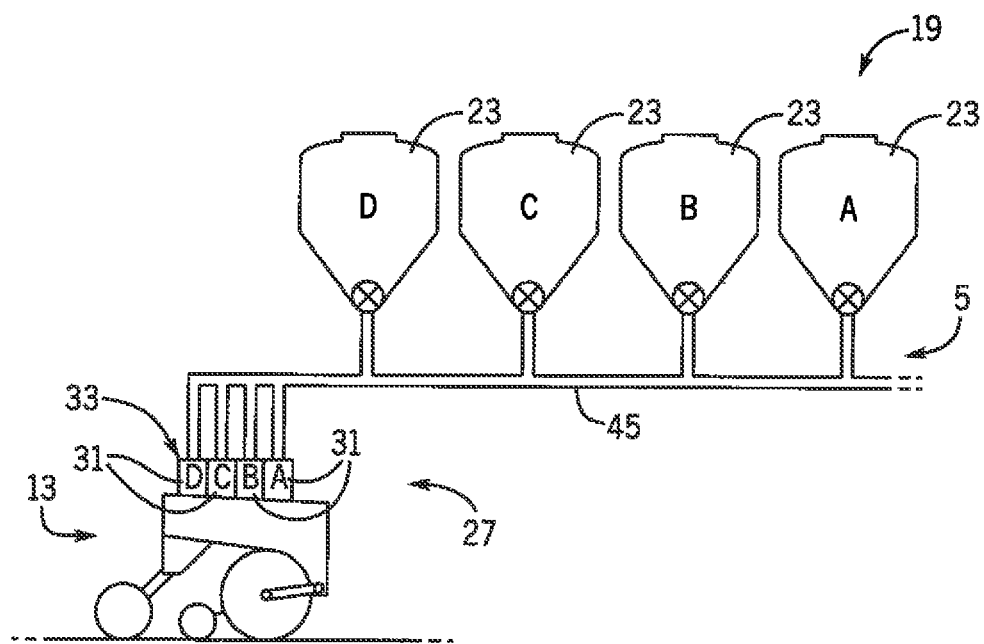
FIG. 13 is another simplified schematic representation of a planting system for planting multiple varieties of seed.
Figure 14:
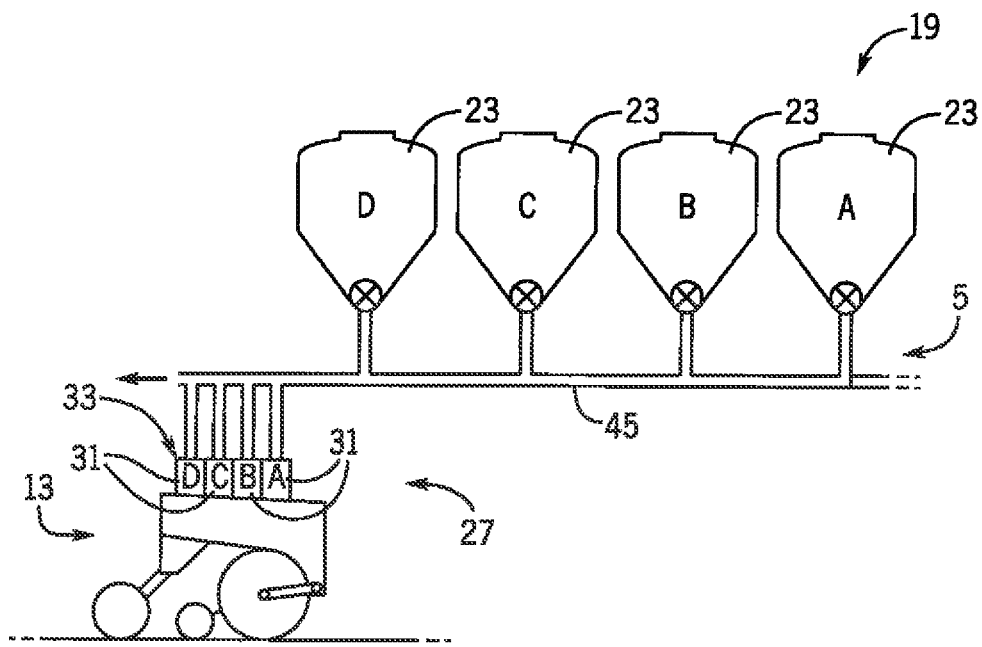
FIG. 14 is another simplified schematic representation of a planting system for planting multiple varieties of seed.

FIG. 7-14 shows variations of the system 5 of FIGS. 1-4. The variations are labeled with configuration numbers and schematically show combinations of different numbers of compartments 31 of the on-row storage system 27, different numbers of seed conduits or feed lines, and corresponding arrangements of the seed lines and compartments. FIG. 15 provides a chart with summary information of the variations of the system 5, such as those shown in FIGS. 7-14. FIG. 7 and cell 105 of FIG. 15 show an individual line for each variety for each row, with a single compartment 31 of the on-row storage system 27 at each row unit 13. This is shown in FIG. 7 as a primary seed feeding line 43 from each one of the compartments 23 of the bulk storage system 19 connecting to a single secondary seed feeding line 45 that is connected to a single compartment 31 of the on-row storage system 27. FIG. 8 and cell 107 of FIG. 15 show a single line for each variety feeding multiple rows, with a single compartment 31 of the on-row storage system 27 at each row unit 13. This is shown in FIG. 7 as a primary seed feeding line 43 from each one of the compartments 23 of the bulk storage system 19 connecting to separate secondary seed feeding lines 45 that connect to a single compartment 31 of the on-row storage system 27, with each primary seed feeding line 43 extending past the respective secondary seed feeding line 45 to the subsequent row units 13. FIG. 9 and cell 109 of FIG. 15 show a single line for each row feeding all varieties, with a single compartment 31 of the on-row storage system 27 at each row unit 13. This is shown in FIG. 7 as a single primary seed feeding line 43 connected to all of the compartments 23 of the bulk storage system 19 and terminating at a single compartment 31 of the on-row storage system 27. FIG. 10 and cell 111 of FIG. 15 show a single line feeding all varieties for all rows, with a single compartment 31 of the on-row storage system 27 at each row unit 13. This is shown in FIG. 7 as a single primary seed feeding line 43 connected to all of the compartments 23 of the bulk storage system 19, connected to a single compartment 31 of the on-row storage system 27 and extending past the respective single compartment 31 of the on-row storage system 27 to the subsequent row units 13. FIG. 11 and cell 113 of FIG. 15 show an individual line for each variety for each row, with multiple compartments 31 of the on-row storage system 27 at each row unit 13. This is shown in FIG. 11 as a primary seed feeding line 43 from each one of the compartments 23 of the bulk storage system 19 connected to a single respective one of the compartments 31 of the on-row storage system 27. FIG. 12 and cell 115 of FIG. 15 show a single line for each variety feeding multiple rows, with multiple compartments 31 of the on-row storage system 27 at each row unit 13. This is shown in FIG. 12 as a primary seed feeding line 43 from each one of the compartments 23 of the bulk storage system 19 connecting to separate secondary seed feeding lines 45 that connect to respective compartments 31 of the on-row storage system 27, with each primary seed feeding line 43 extending past the respective secondary seed feeding line 45 to the subsequent row units 13. FIG. 13 and cell 117 of FIG. 15 show a single line for each row feeding all varieties, with multiple compartments 31 of the on-row storage system 27 at each row unit 13. This is shown in FIG. 13 as a single primary seed feeding line 43 connected to all of the compartments 23 of the bulk storage system 19 and terminating at the row unit 13 while connecting to each of the compartments 31 of the on-row storage system 27. FIG. 14 and cell 119 of FIG. 15 show a single line feeding all varieties for all rows, with multiple compartments 31 of the on-row storage system 27 at each row unit 13. This is shown in FIG. 14 as a single primary seed feeding line 43 connected to all of the compartments 23 of the bulk storage system 19, connected to each of the compartments 31 of the on-row storage system 27, and extending past the respective single compartment 31 of the on-row storage system 27 to the subsequent row units 13. Referring now to FIG. 15, cells 105, 107, 109, 111, 113, 115, 117, 119 represent a planter 7 (FIG. 1) with a single seed meter 35 at each row unit 13, whereas cells 121, 123, 125, 127 of FIG. 15 represent a planter 7 with multiple seed meters 35 at each row unit 13, such as twin-row planters. Regardless of the particular configuration of the planter 7, it is understood that the variations of system 5 represented in FIGS. 7-14 may include the charging system 37 (FIG. 2) or respective components such as the intersections of various planter components to achieve the selective charging.

In an embodiment in which row by row multi-variety control is not required, and/or in which a 100% switchover within a relatively short distance is not required, the compartments 31 and rollers 41 of the mini-hoppers 33 can be eliminated.

In one embodiment, the system 5 is incorporated with a non-bulk fill planter 7 equipped with row mounted seed hoppers as long as each row hopper is partitioned and is able to gravity feed into the seed meter reservoirs. This embodiment does not require a central bulk fill hopper(s) 21 or charging system 37, but may instead include a partitioned on-row hopper or multiple on-row hoppers as the compartments 31 to gravity feed into the row unit reservoir 47 or internal reservoir of the seed meter 35.

Figure 16:
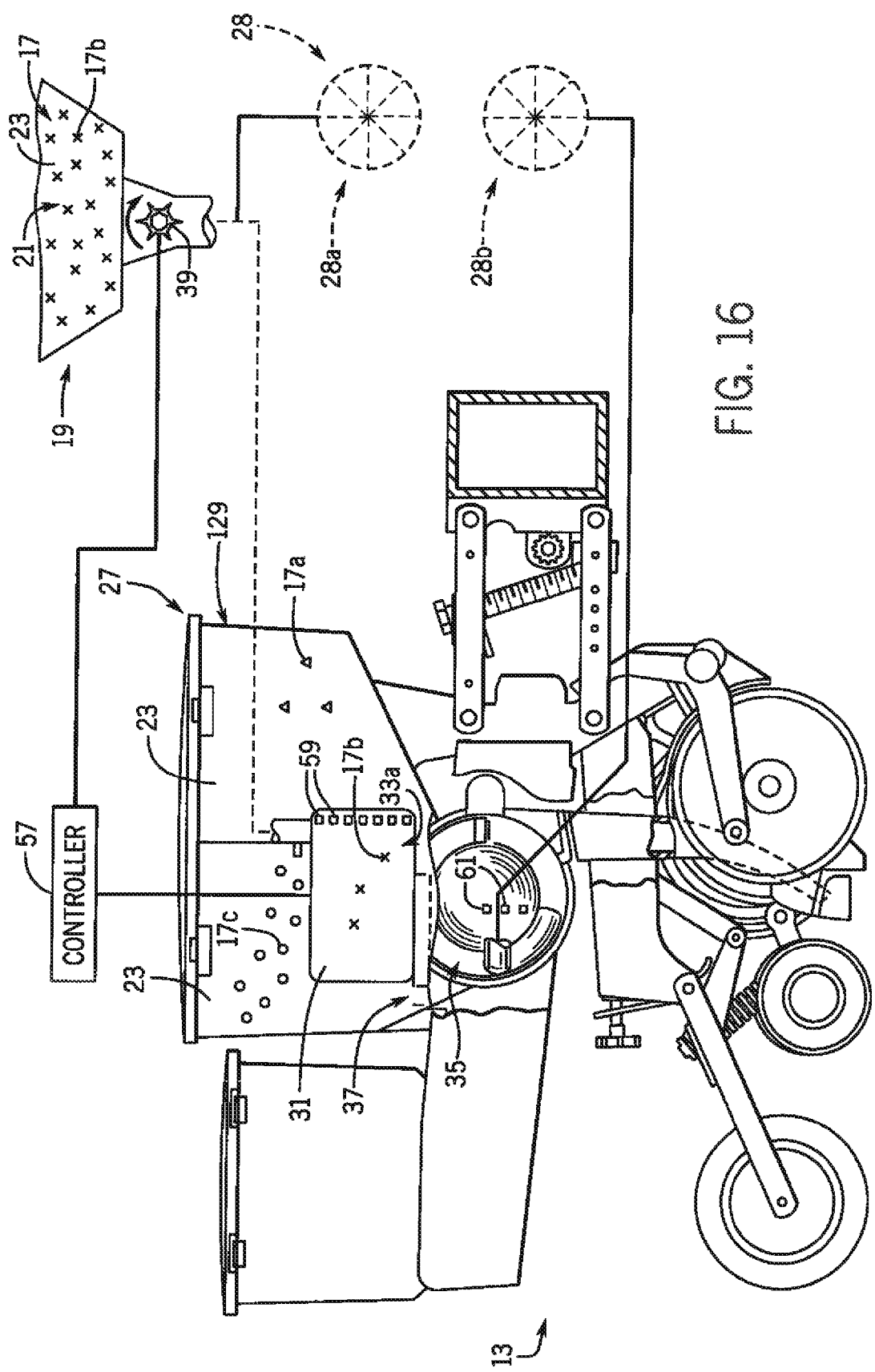
FIG. 16 is another simplified schematic representation of a planting system for planting multiple varieties of seed.

Referring now to FIG. 16, in this embodiment, the system 5 includes a combination of central bulk fill hopper(s) 21 of a bulk storage system 19 feeding a mini-hopper 33a as one compartment 31 at each row unit 13, with seed type 17b stored in bulk remotely from the row unit 13. Seed types 17a, 17c are stored in bulk on the row itself, in a partitioned on-row hopper 129 of the on-row storage system 27 or multiple on-row hoppers on each row unit 13. Charging system 37 is arranged to selectively deliver seeds of the various types 17a, 17b, 17c to the seed meter 35, such as by way of rollers 41 (FIG. 1) arranged between the compartments 23, 31 of the on-row hopper 129 and mini-hopper and the seed meter 35. The mini-hopper 33a, would be fed from a bulk fill hopper(s) 21 of the bulk storage system 19 as previously explained. The on-row hopper 129 could be used to hold the varieties of seed 17 that would be less frequently used in its compartments 23. The mini-hopper 33a fed from the bulk fill hopper(s) 21 could be used for the seed 17 that will be planted on a majority of the field. This configuration eliminates partitions and separate compartments 23 of the remote, centrally located bulk fill hopper(s) 21, and may reduce the number of seed conduits or feed lines, gates, and rollers, as compared to the previously described charging system 37.

Many changes and modifications could be made to the invention without departing from the spirit thereof. Various components and features of the system 5, for example, components or features of the seed storage system(s), charging system(s), and seed metering system(s) can be incorporated alone or in different combinations on a planter or seeder. The scope of these changes will become apparent from the appended claims.

We claim:

1. A method of planting or seeding multiple types of seed in a single planting pass during row-crop planting or seeding of an agricultural field with an agricultural implement, the method comprising:
    storing seeds of multiple types including at least a first type and a second type in multiple compartments of a bulk storage system;
    selectively transporting the multiple types of seeds along a common flow path towards a plurality of on-row storage systems, each on-row storage system including multiple compartments;
    diverting each of the multiple types of seeds to a selected one of the multiple compartments of the plurality of on-row storage systems;
    storing the seeds of multiple types in the multiple compartments of the on-row storage systems;
    selectively delivering seeds of the first type from a first compartment of a first on-row storage system to a first seed-metering system;
    releasing seeds of the first type from the first seed-metering system to a first type zone of multiple type zones of the agricultural field;
    selectively delivering seeds of the second type from a second compartment of a second on-row storage system to a second seed-metering system; and
    releasing seeds of the second type from the second seed-metering system to a second type zone of the multiple type zones of the agricultural field.

2. The method of claim 1 wherein:
    the agricultural implement is a planter having multiple row units;
    each seed-metering system is provided at a corresponding one of the multiple row units and includes a seed meter;
    the multiple compartments of each on-row storage system include the first compartment and the second compartment at each of the row units; and
    the first and second compartments of the on-row storage system at each row unit selectively deliver seeds of the first and second types to the respective seed meter based on a position of the planter relative to the first and second type zones of the agricultural field.

3. The method of claim 2 further comprising controlling the seed-metering system to release seeds of the first and second type simultaneously from first and second row units of the planter for controlling planting of delivery of an individual seed type on a per row basis.

4. The method of claim 3 wherein at each row unit, the seed meter includes at least one sensor arranged to determine an amount of seed within a seed pool inside the seed meter and further comprises controlling the seed pool by delivering one of the multiple types of seed to the respective seed meter based on the determined amount of seed within the seed pool.

5. The method of claim 1 further comprising detecting fill values of the multiple compartments of each on-row storage system and charging one of the multiple compartments of each on-row storage system independently of the other ones of the multiple compartments of the on-row storage system based on the detected fill values of the multiple compartments of each on-row storage system.

6. The method of claim 5 further comprising charging a single one of the multiple compartments of at least one of the plurality of on-row storage systems at a single row unit of the planter during a charging event.

7. The method of claim 1 further comprising maintaining a fill level in the multiple compartments of each on-row storage system by a prioritized charging during which an order of filling the multiple compartments is performed according to an immediate need based on at least one of a detected lowest level of seeds within the multiple compartments and a location of the agricultural implement according to a prescription map of the agricultural field.

8. The method of claim 7 further comprising detecting fill values of the multiple compartments of each on-row storage system and upon detection of low-level conditions of respective ones of the multiple compartments as low-level compartments, charging the low-level compartments during discrete independent charging events.

9. The method of claim 8 wherein the agricultural implement is a planter having multiple row units with a corresponding seed metering system at each of the multiple row units, wherein at each of the row units, the multiple compartments of a respective on-row storage system are defined within a mini-hopper at the respective row unit, and the method further comprises selectively directing seed to low-level compartments in the mini-hopper at each row unit base on the respective detected low-level conditions.

10. The method of claim 7 wherein the step of diverting each of the multiple types of seeds to a selected one of the multiple compartments of the plurality of on-row storage systems includes the step of controlling a diverter system arranged between the multiple compartments of the bulk storage system and the multiple compartments of a corresponding one of the plurality of on-row storage systems to selectively define flow paths along the planter between the low-level compartments and the respective compartments of the bulk storage system.

11. The method of claim 1 wherein the agricultural implement includes multiple row units and the method further comprises directing seeds of each of the multiple types at different times through a common seed feeding line feeding all of the multiple row units based on a location of the agricultural implement relative to the multiple type zones of the agricultural field.

12. The method of claim 1 wherein the agricultural implement includes multiple row units, and wherein the step of selectively transporting the multiple types of seeds along the common flow path towards the plurality of on-row storage systems includes the step directing seeds of each of the multiple types at different times through the common flow path and through multiple common seed feeding lines feeding the multiple row units with each of the multiple common seed feeding lines feeding a respective one of the multiple row units based on a location of the agricultural implement relative to the multiple type zones of the agricultural field.

13. The method of claim 1 wherein the agricultural implement includes multiple row units and wherein the step of selectively transporting the multiple types of seeds along the common flow path towards the plurality of on-row storage systems includes the step directing seeds of each of the multiple types at different times through the common flow path and through multiple seed feeding lines with each seed feeding line feeding seeds of a respective one of the multiple types to more than one of the multiple row units based on a location of the agricultural implement relative to the multiple type zones of the agricultural field.

14. The method of claim 1 wherein the agricultural implement includes multiple row units, and wherein the step of selectively transporting the multiple types of seeds along the common flow path towards the plurality of on-row storage systems includes the step directing seeds of each of the multiple types at different times through the common flow path and through multiple seed feeding lines with each seed feeding line feeding seeds of a respective one of the multiple types to a respective one of the multiple row units.

15. A method of charging a seed metering system of a planter for planting multiple types of seed in a single planting pass during row-crop planting of an agricultural field, the method comprising:
detecting a seed level in each of multiple compartments of an on-row storage system at each of multiple row units of the planter, wherein the multiple compartments hold seeds of multiple types with each compartment holding seeds of a different type than the other compartments;
evaluating whether any of the detected seed levels are below a predetermined minimum seed level, defining a low-level compartment; and
releasing seeds from a compartment of a bulk storage system storing the same variety of seed as in the low-level compartment to fill the low-level compartment of the on-row storage system with the same variety of seed.

16. The method of claim 15 further comprising releasing multiple types of seeds from multiple compartments of the on-row storage system to provide a seed pool having a mixture of the different types of seeds within a seed meter at one of the row units.

17. The method of claim 16 wherein releasing seed from the compartment of the bulk storage system includes controlling a metering device including at least one of a calibrated metering roller, an auger, and a gate, to release an amount of seed needed to fill the low-level compartment to a completely full level based on the detected seed level.

18. The method of claim 15 further comprising actuating a first seed gate arranged to selectively direct seed from the bulk storage system to the on-row storage system of one of the rows of the planter and actuating a second seed gate arranged to selectively direct seed into one of the compartments of the on-row storage system.

19. A planter for planting multiple types of seed in a single planting pass during row-crop planting of an agricultural field, comprising:
a frame supporting multiple row units;
a bulk storage system for separately storing seeds of multiple types on the planter;
an on-row storage system selectively receiving seed from the bulk storage system and separately storing the seeds of the multiple seed types at the row units;
a flow path at least partially interconnecting the bulk storage system and the on-row storage system for selectively carrying a selected one of the multiple types of seeds from the bulk storage system toward the on-row storage system;

a diverter in communication with the flow path for selectively diverting the selective one of the multiple types of seeds in the flow path to a corresponding storage compartment at the row units; and a charging system selectively delivering seeds of the multiple types from the bulk storage system to the on-row storage system during discrete charging events based on a position of at least one of the planter and a tractor towing the planter relative to predetermined multiple type zones of an agricultural field.

20. The planter of claim 19 wherein the bulk storage system includes at least one compartment at each of multiple row units and is configured for manual filling of seeds.

* * * * *